United States Patent
Hufenbach et al.

(10) Patent No.: US 10,266,026 B2
(45) Date of Patent: Apr. 23, 2019

(54) DEVICE FOR INTRODUCING FORCE INTO A COMPONENT OF FIBER COMPOSITE MATERIAL

(71) Applicant: LEICHTBAU-ZENTRUM SACHSEN GMBH, Dresden (DE)

(72) Inventors: Werner Hufenbach, Dresden (DE); Martin Lepper, Dresden (DE); Jens Werner, Coswig (DE); Enrico Ladusch, Dresden (DE)

(73) Assignee: LEICHTBAU-ZENTRUM SACHSEN GMBH, Dresden (DE)

( * ) Notice: Subject to any disclaimer, the term of this patent is extended or adjusted under 35 U.S.C. 154(b) by 722 days.

(21) Appl. No.: 14/360,025

(22) PCT Filed: Nov. 22, 2012

(86) PCT No.: PCT/DE2012/100356
§ 371 (c)(1),
(2) Date: May 22, 2014

(87) PCT Pub. No.: WO2013/075707
PCT Pub. Date: May 30, 2013

(65) Prior Publication Data
US 2014/0321941 A1 Oct. 30, 2014

(30) Foreign Application Priority Data
Nov. 24, 2011 (DE) .................. 10 2011 119 251

(51) Int. Cl.
*F16B 5/02* (2006.01)
*B60G 7/00* (2006.01)
(Continued)

(52) U.S. Cl.
CPC .......... *B60G 7/008* (2013.01); *B62D 27/065* (2013.01); *F16B 5/01* (2013.01); *F16B 5/02* (2013.01); *F16B 35/00* (2013.01); *F16B 43/002* (2013.01)

(58) Field of Classification Search
CPC ......... F16B 5/02; F16B 37/145; F16B 43/002
(Continued)

(56) References Cited

U.S. PATENT DOCUMENTS 3,823,526 A * 7/1974 Rose .................. F16B 5/02
403/408.1
4,689,928 A * 9/1987 Dutton .................. E04F 13/081
403/143
(Continued)

FOREIGN PATENT DOCUMENTS

DE 29817352 U1 2/1999
DE 20218302 U1 2/2003
(Continued)

*Primary Examiner* — Flemming Saether
(74) *Attorney, Agent, or Firm* — Abel Schillinger, LLP (57) ABSTRACT

The invention relates to a device for introducing force into a component of fiber composite material by means of a screw connection having a bolt-like connecting element arranged in a passage of the component. The invention is based in particular on the problem of improving the durability of the screw connection on the component of fiber composite material. The object is achieved in that the screw connection has a two-part bush (6) which borders the passage (2) of the component (1) and accommodates the connecting element (9), wherein the first and the second bush part (6.1, 6.2) of the bush (6) are designed to engage in one another in axial extension, and each bush part (6.1, 6.2) has a radially extended union collar (15.1, 15.2) with a collar side (16.1, 16.2) facing the component (1), on which side a sliding surface is formed.

20 Claims, 5 Drawing Sheets (51) Int. Cl.
*F16B 5/01* (2006.01)
*F16B 43/00* (2006.01)
*B62D 27/06* (2006.01)
*F16B 35/00* (2006.01)

(58) Field of Classification Search
USPC .................................. 411/338, 534; 52/235
See application file for complete search history.

(56) References Cited

U.S. PATENT DOCUMENTS

| | | | | |
|---|---|---|---|---|
| 4,746,248 A | * | 5/1988 | Lillis | E21D 21/0086 |
| | | | | 405/259.5 |
| 4,878,795 A | * | 11/1989 | Woodrow | F16B 5/01 |
| | | | | 411/183 |
| 5,037,259 A | * | 8/1991 | Duran | F16B 39/22 |
| | | | | 411/173 |
| 5,205,692 A | * | 4/1993 | Kelbert | F16B 5/0216 |
| | | | | 411/173 |
| 5,275,529 A | * | 1/1994 | Langenbrunner | F02C 7/045 |
| | | | | 244/132 |
| 5,447,399 A | * | 9/1995 | Yoshida | F16B 5/02 |
| | | | | 411/339 |
| 5,855,462 A | * | 1/1999 | Weiss | F16D 3/79 |
| | | | | 411/383 |
| 6,210,067 B1 | * | 4/2001 | Postma | F16B 2/241 |
| | | | | 403/30 |
| 6,264,412 B1 | * | 7/2001 | Nakamura | F16B 5/01 |
| | | | | 411/107 |
| 7,891,073 B2 | | 2/2011 | Blanchart et al. | |
| 8,002,639 B2 | * | 8/2011 | Mayr | F16D 3/72 |
| | | | | 411/534 |
| 2001/0023562 A1 | * | 9/2001 | Blobaum | B32B 17/10293 |
| | | | | 52/235 |
| 2004/0154242 A1 | * | 8/2004 | Hudoba | E06B 9/02 |
| | | | | 52/202 |
| 2006/0231586 A1 | | 10/2006 | Blanchart et al. | |
| 2008/0005983 A1 | * | 1/2008 | Lin | E06B 3/5436 |
| | | | | 52/235 |
| 2009/0314426 A1 | | 12/2009 | Steinke | |
| 2011/0116897 A1 | | 5/2011 | Carrasco Carrasco | |

FOREIGN PATENT DOCUMENTS

| | | |
|---|---|---|
| DE | 102006013069 B3 | 12/2007 |
| EP | 1712803 A1 | 10/2006 |
| EP | 2316724 A2 | 5/2011 |
| FR | 2944329 A1 | 10/2010 |

\* cited by examiner

DEVICE FOR INTRODUCING FORCE INTO A COMPONENT OF FIBER COMPOSITE MATERIAL

BACKGROUND OF THE INVENTION

1. Field of the Invention

The invention concerns a device for introducing force into a component of fiber composite material by means of a screw connection having a bolt-like connecting element arranged in the passage of the component.

2. Discussion of Background Information

The device is used for constructions that are to be point-connected to components made from relatively soft material such as e.g. boards made of fiber-reinforced plastic, whereby forces acting upon the constructions are transferred into the components made of fiber composite material. The known connections mainly consist of connecting metal elements penetrating the plastic component, which is screw-connected to the components similar to a bolt connection. Such devices are for example used in the vehicle technology for wheel suspensions or for connecting chassis control arms to fiber composite parts.

The—mainly dynamically—acting forces are guided into the hole cross section of the fiber composite component via the connecting element, where in particular large surface components with a minimal thickness experience a high level of stress. The dynamic forces cause minimal relative movements of the metal connecting element towards the fiber composite structure of the component, causing a so-called vibration friction wear at the fiber composite component. The vibration friction processes can cause damage to the fiber composite structure as well as weaken the metal connecting element.

Following the trend of economising space and material, especially in the vehicle section, connections with a one-sided introduction of force into the plastic component are increasingly in demand, which will make the component highly resilient.

Figure 1:
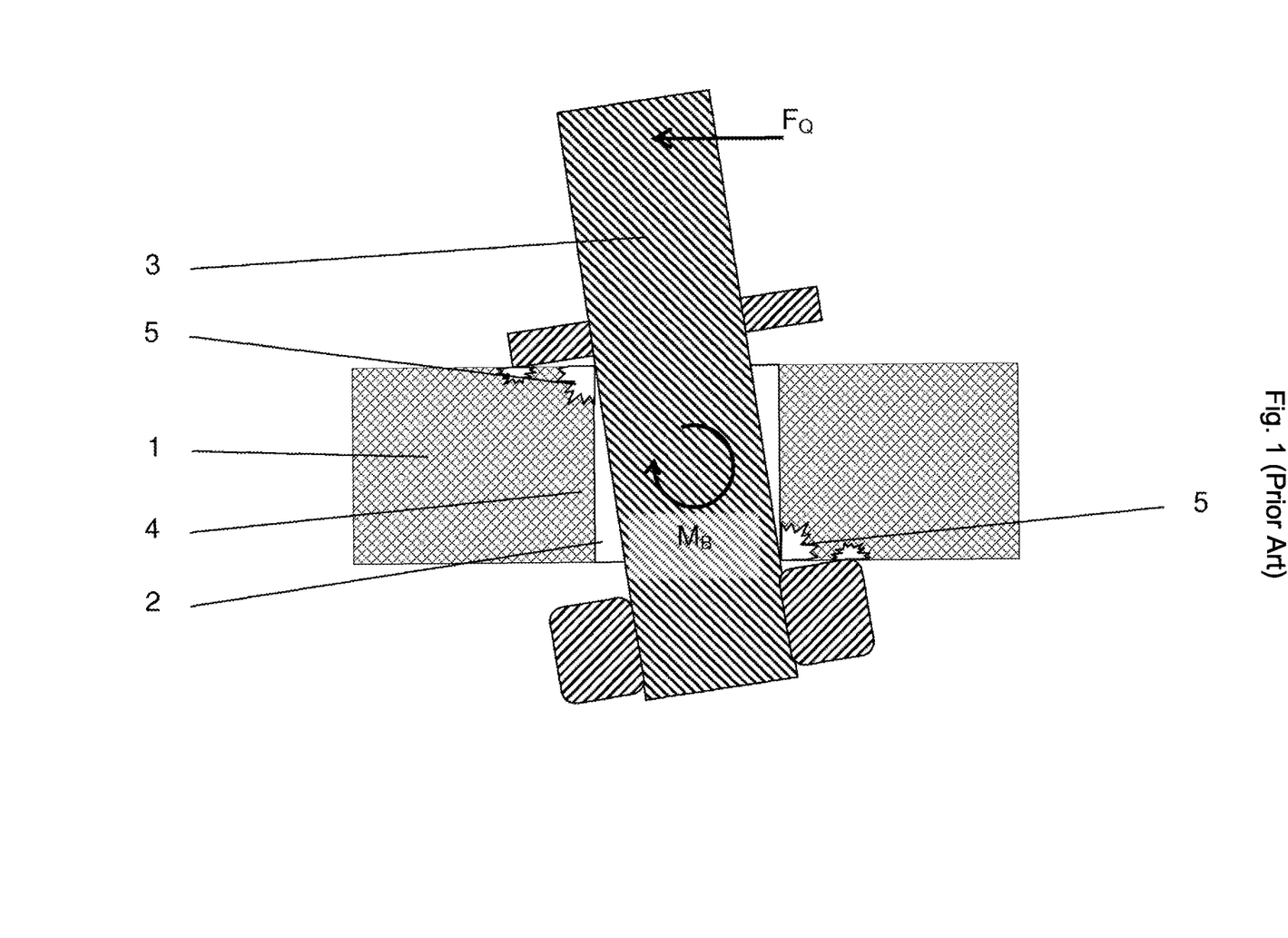

Forces that attack from one side and diagonally to the passage of the component via the lever of the connecting element, result in a tilting-resp. bending moment in the device, supporting the vibration friction wear at the plastic component additionally, and will finally lead to an early failure of the connection (compare FIG. 1, Device for the state-of-the-art technology). Particularly serious damage is caused due to the relative movements and the tilting-resp. bending moment at the fiber composite components, whose fiber orientation essentially runs vertically to the longitudinal axis of the passage. The reinforcement fibers in this orientation do not withstand the stress much. Additionally, the reinforcement fibers, ending orthogonally in the hole friction surface of the passage, act extremely abrasive on the metal connecting element.

The invention is based on the problem to further develop a device of the type mentioned above that removes the disadvantages of the state-of-the-art technology, in particular to improve the stability of the screw connection at the component made of fiber composite material.

SUMMARY OF THE INVENTION

The problem is solved with a device according to the invention as set forth herein. The invention suggests that the screw connection has a two-part bush which borders the passage of the component and accommodates the connecting element, wherein the first and the second bush part of the bush are designed to engage in one another in an axial extension and each bush part has a radially extended union collar with a collar side facing the component on which side a sliding surface is formed.

The bush parts are designed such that in their assembly condition they line the passage to the plastic component and form a passage for the connecting element. The screw connection of the connecting element according to the invention to the component is carried out indirectly via the bush parts. The bush parts have collars, which, during assembly, fit closely to the upper side resp. bottom of the component with their collar sides facing the component. Due to the design of the bush parts according to the invention, whereby the first bush part engages in the second bush part or vice versa, both bush parts are in an operative connection with each other.

With this device, the tilting resp. bending moment, resulting from diagonally introduced one-sided forces via the connecting element, can be supported mainly via the collars of both bush parts in a flat manner at the upper- and bottom side of the plastic component. The bending moment resulting from the introduced force can be deflected large scale by a compressive force of the relevant bush part into the upper-resp. lower part of the component of fiber composite material via the collar. In doing this the collar sides of the collar facing the component slide on the upper-resp. lower part of the plastic component. The bush parts carry out a relative movement towards the component, which are radially orientated to the greatest possible extent by means of the design of the invention.

The provided sliding surface at the collar sides of each of the bush parts is slightly rough and has preferably been ground or polished. An oil film on the collar sides is also possible. The increased sliding ability of the collar sides of the collars enables a frictionless sliding between the collar sides of the union collar and the surface of the component and eases the radially directed relative movements of the bush parts engaging into each other towards the component. The relative movements, which are particularly intense resulting from tilting-resp. bending moments caused by dynamic diagonal forces, can thus be reduced by minimally stressing the component.

The diagonally acting force at the connecting element is introduced into the component made of fiber composite material mainly vertically to the bearing stress surface of the passage, not at an angle via the edge sections of the passage. Thus the friction and wear in the area of bearing stress at the passage is reduced and the sensitive edges at the passage mostly protected from any damage.

The device of this invention is particularly advantageous for components made from fiber composite material with a fiber orientation essentially arranged vertically to the longitudinal axis of the passage. Such a component excellently resists the stress of forces introduced via the bearing stress surface at the passage, as the forces are mainly introduced in the direction of the fiber orientation of the component made of fiber composite material and thus in the direction of a higher loading capacity of the fiber composite structure.

Advantageous designs and further development of the invention become apparent from the dependent claims, the below description and the appended drawings.

In a preferred embodiment of the device, the first bush part shows an axially extended shaft arranged in the passage of the component and for being inserted into an opening of the second bush part. Introducing the diagonal force into the component can be done via the shaft across the overall surface of bearing stress at the passage; in this way the sections of the bearing stress and edges at the passage can be protected even better still. At the same time the plug connection at the shaft end in the opening of the second bush part offers a constructive and simple solution for engaging the bush parts into one another during the assembly.

Should the shaft be longer than the wall thickness of the component, a shaft protrusion can be made available during assembly for an easier assembly of the second bush part.

Preferably the outer contour of the shaft end corresponds to the inner contour of the opening, thus achieving an interlocking plug connection. This means that the introduced diagonal force can be distributed much better to the bush parts and is subsequently transferred to the union collar.

Once the outer contour of the shaft corresponds to the inner contour of the passage, the shaft sits flush on the bearing stress surface and interlinks with the passage such that the introduced diagonal force is all the more distributed evenly across the surface of bearing stress area at the passage.

In a particularly favoured embodiment, a sliding disk, preferably made from hardened metal, Teflon, ceramic, or similar material, is arranged between the union collar of the first bush part and one side of the component and/or between the union collar of a second bush part and a second side of the component. Thus the tilting-resp. bending moment can be supported via the collar side of the union collar on the sliding disk, without the surface of the component being stressed too much. The bending moment resulting from the force to be introduced is introduced by a compressing force via the bush part into the sliding disk and thus large scale into the component. Additionally, the bush part can slide off via the sliding disk. Thus the sliding disk reduces the friction wear on the surface of the component. Due to the material, the contact surface between the sliding surface of the collar side of the union collar and the sliding disk shows a reduced friction coefficient compared to the contact surface between the sliding disk and the surface of the component. This generates a lower friction resistance between the sliding disk and the union collar of the relevant bush part than between the sliding disk and the component. The relative movements from the introduction of force and the sliding off of the bush part are mainly taking place between the bush part and the appertaining sliding disk, whereby the component surface is better protected against friction.

Preferably the sliding disk is designed and arranged such that the surface of one side of the disk facing the union collar has a lesser rough surface than the surface of the side of the sliding disk facing the component. In this way, e.g., the side of the sliding disk facing the union collar can be ground or polished, whereas the side of the sliding disk facing the component can have a rougher surface, e.g. by sand-blasting. Thus the different friction resistance and friction coefficient on both sides of the sliding disk is enhanced even more distinctly. The sliding ability between the collar side of the union collar and the sliding disk is increased so that there is only a slight friction to be expected on the surface of the component.

If the sliding disk is firmly connected to the component, preferably by bonding, any friction between the sliding disk and the component is eliminated, protecting the surface of the component.

An advantageous embodiment of the device comprises the sliding disk provided with a circumferential web. This web, arranged towards the passage, serves to assist the sliding disk to fit closely to the surface of the bearing stress at the passage. By means of this web, the surface of the bearing stress at the passage in the component of fiber composite material can be protected even better from wear caused by vibration friction. Also, the shaft of the bush part protruding into the passage is better protected against the abrasion caused by the hard cutting edges of the fibers of the component ending at the surface of the bearing stress of the passage. The webs thus prevent a wear possible caused by vibration friction incurred in the passage at the bush part due to minimal relative movements between bush part and the component.

In a particularly advantageous embodiment of the device, the outer contour of the shaft of the first bush part and the inner contour of the web at the sliding disk are designed correspondingly such, that the first bush part and the sliding disk can be connected to each other in a close fit, preferably in an interlocking and tight fit. If, in the state of assembling the device, a bush part is connected with the web of the sliding disk, preferably in an interlocking and close fit, the normal share of force of the diagonal force can be introduced reliably via the web onto the surface of the bearing stress at the passage from the component. Such a close fitting connection can e.g. be realised by means of an interference fit adjusted to the outer contour of the shaft with a fitting surface on the inner contour of the web facing the shaft.

In a further advantageous embodiment of the device, the first bush part shows a circumferential recess between the collar and the shaft and/or the second bush part has a bevel applied at a transition between union collar and opening. Thus the transition between shaft and union collar of the first bush part is contact-free towards the component resp. towards the sliding disk due to a circumferential groove. At the same time, the second bush part has a certain play at the bevel of the opening of the second bush part towards the component resp. sliding disk. Thus the danger of an angled introduction of force onto the edges of the passage of the plastic component is additionally reduced, protecting the component even better from the influence of a tilting-resp. bending moment.

In a preferred design the bush parts show fitting areas corresponding with each other or threads corresponding with each other such that the bush parts can be closely connected by means of an interference fit or a thread connection. This increases the operative connection of the bush parts in favour of an even better distributed introduction of the tilting-resp. bending moment onto both bush parts. This detachable thread connection also enables a simple and non-destructive assembly and dismantling of the bush parts and ascertains that the parts of the device can be exchanged.

In a particularly preferred design of the device, the bush and the connecting element are designed such that the connecting element can be interlocked, preferably interlocked and closely fitted, with the first bush part and/or the second bush part.

If, for example, an outer contour of the connecting element is designed to correspond with an inner contour of the shaft of the first bush part, an interlocking between the connecting element and the first bush part can be realised in their state of assembly, through which the share of normal force of the diagonal force acting on the connecting element can be reliably guided into the first and second bush part and subsequently into the area of bearing stress at the passage of the component, and also the upper- and lower part of the component.

If the connecting element interlocks with the second bush part by corresponding contours, such as e.g. an outer contour of the connecting element with an inner contour of the opening of the second bush part, the share of the bending moment of the diagonal force can directly be guided from the connecting element via the second bush part into the upper-resp. lower part of the component.

If the outer contour of the connecting element and the inner contour of the shaft of the first bush part shaped conically, a closely fitted connection can be established during assembly by means of an interference fit, making the transfer of force from the connecting element to the bush parts even more effective.

Further advantages are produced, if the first bush part and/or the second bush part are bonded at least in sections, preferably by being glued on to the component. By applying this measure, adverse relative movements between the metallic bush parts and the component of fiber composite material, can be eliminated completely in certain sections, such as for example in the passage of the component.

These features and further ones contained in the patent claims, the description and exemplary embodiments, and drawings can each individually or in combination be realized as an advantageous form of execution of the invention, for which protection is claimed in here.

BRIEF DESCRIPTION OF THE DRAWINGS

The device as per the invention is further explained by means of two exemplary embodiments in more detail. The appertaining drawings show the following in a schematic diagram FIG. 1 a cross-section view of a device for introducing force into a board of fiber composite material according to the prior art, FIG. 2 a cross-section view of a device according to the invention for introducing force into a board made from fiber composite material according to a first exemplary embodiment, FIG. 3 a cross-section view of a device according to the invention for introducing force into a board made from fiber composite material according to a second exemplary embodiment, FIG. 4 a cross-section view of a device according to the invention for introducing force into a board made from fiber composite material according to a third exemplary embodiment, FIG. 5 a detailed view A.1 of the connection of the bush parts of the device acc. to FIG. 3 in a first embodiment, FIG. 6 a detailed view A.2 of the connection of the bush parts of the device acc. to FIG. 3 in a second embodiment.

DETAILED DESCRIPTION OF THE INVENTION

FIG. 1 shows a device for introducing force into a board-type component 1 made from fiber composite material of the state of technology. A screw bolt 3 guided through hole 2 of component 1 is connected with component 1 by means of a screw connection. A free space of the screw bolt 3 is attacked by a construction not displayed. Parallel to the board level occurring diagonal forces FQ of the construction, especially also dynamic diagonal forces, are introduced on one side of component 1 and via a lever arm of screw bolt 3 selectively into component 1. Despite screw bolt 3 being axially interlocked and closely fitted to the component in a screw connection, a tilting-resp. bending moment $M_B$ and a resulting tilting of screw bolt 3 in hole 2 of component 1 cannot be prevented. During the permanent stress caused by the force introduced to the construction, the sensitive bearing stress 4 of hole 2 is exposed to a considerable vibration friction wear, acting particularly negative on the edge sections 5 of hole 2, which finally leads to the connection failing.

Figure 2:
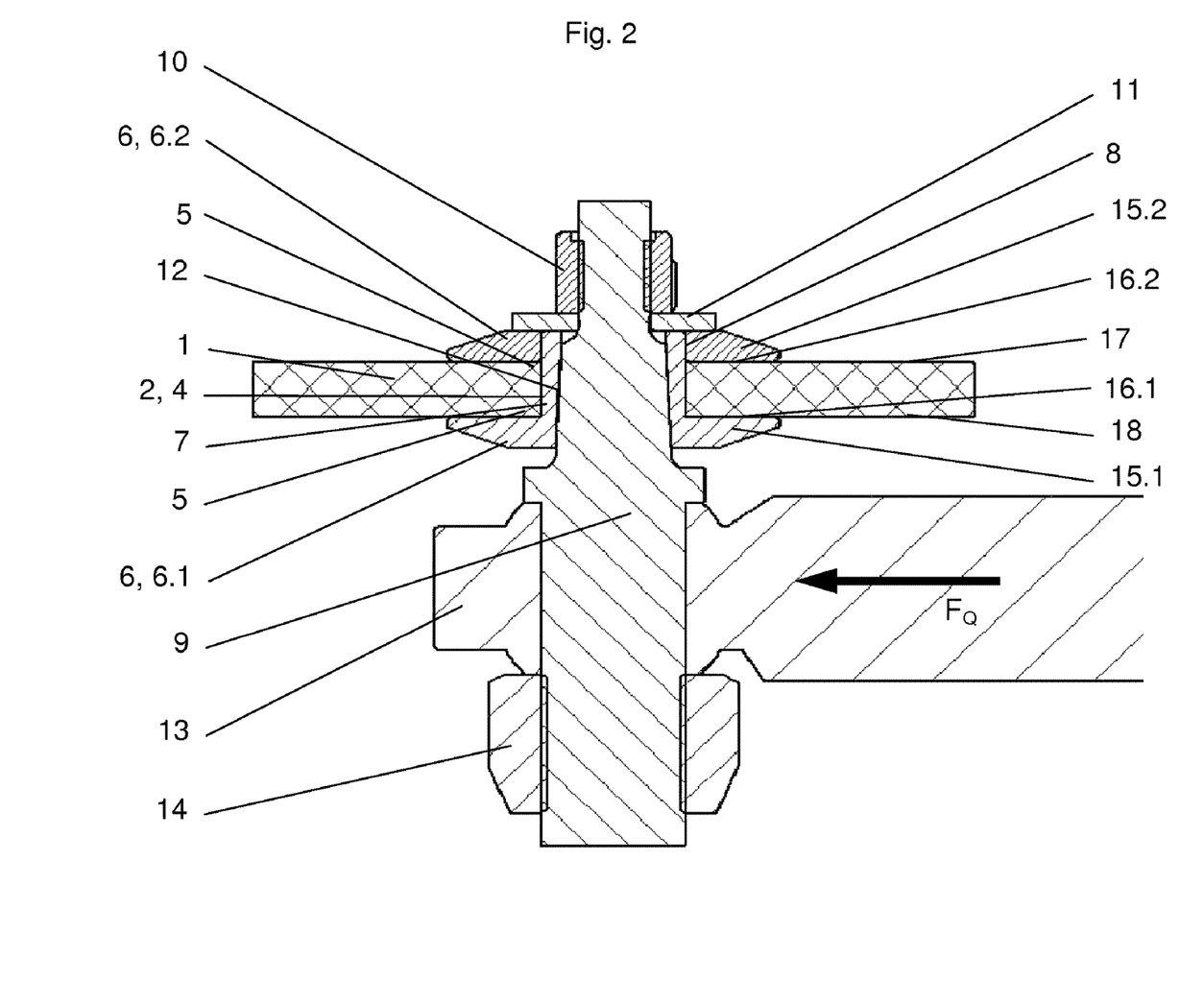
Figure 4:
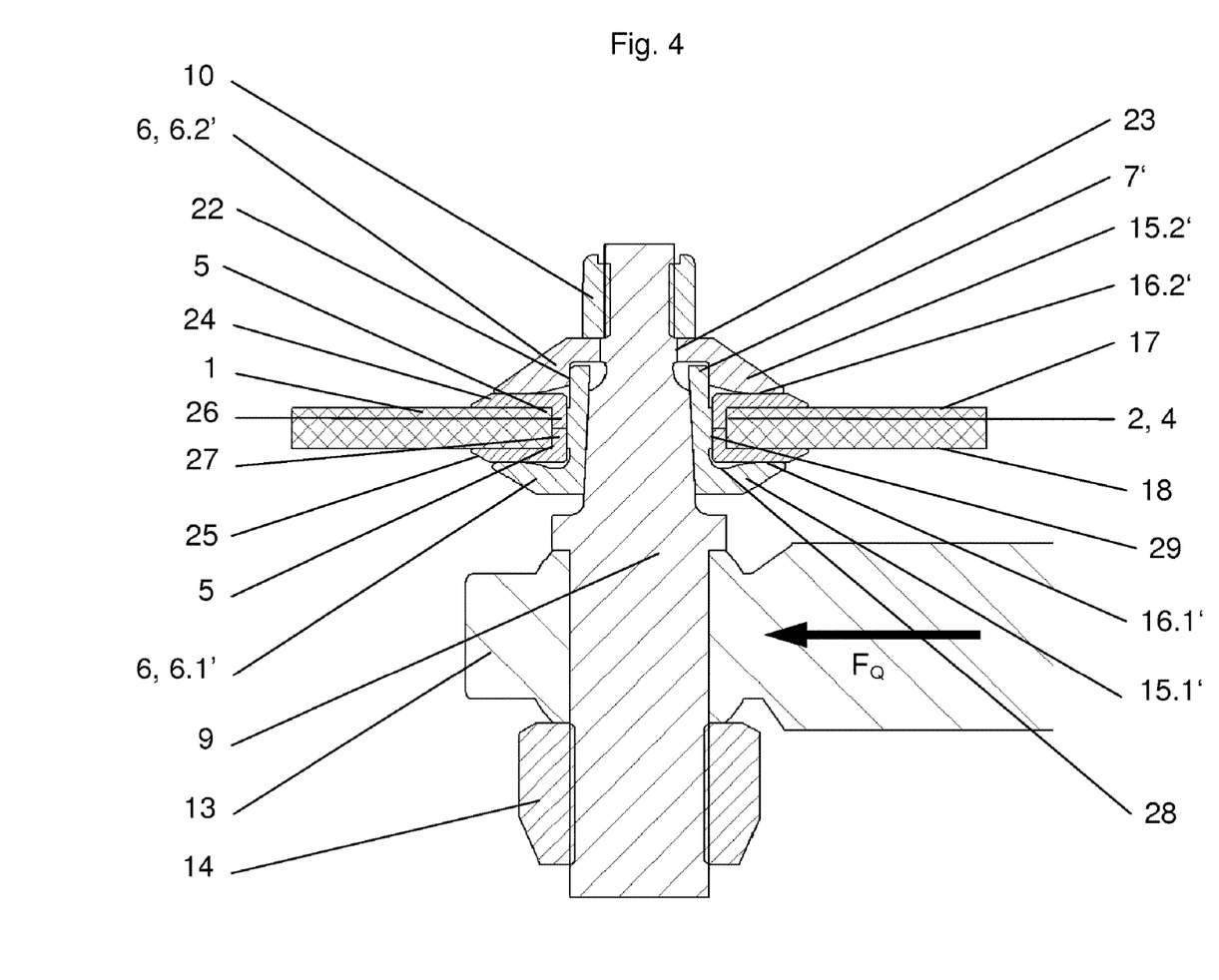
Figure 5:
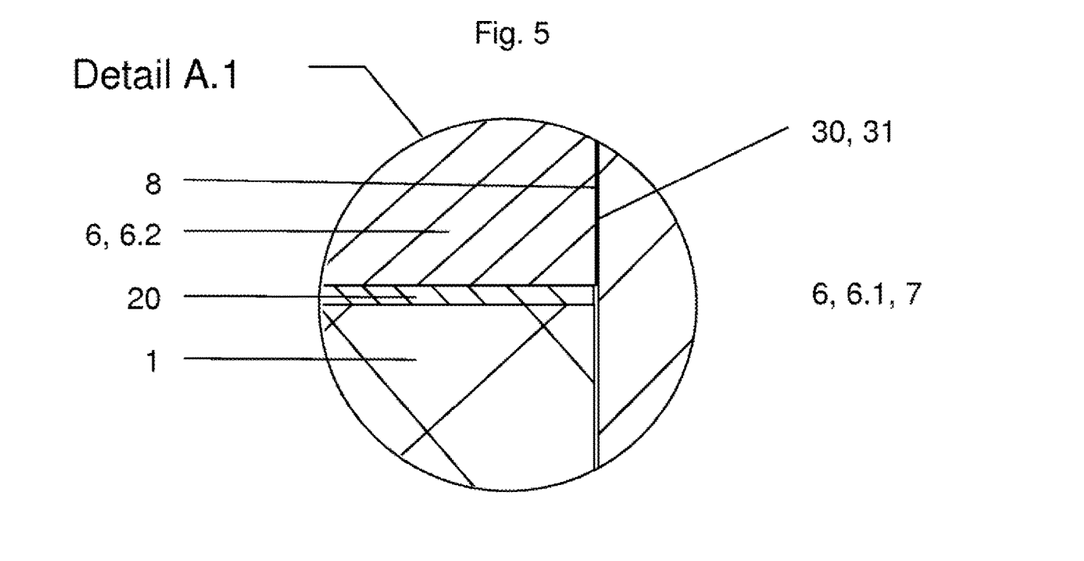
Figure 6:
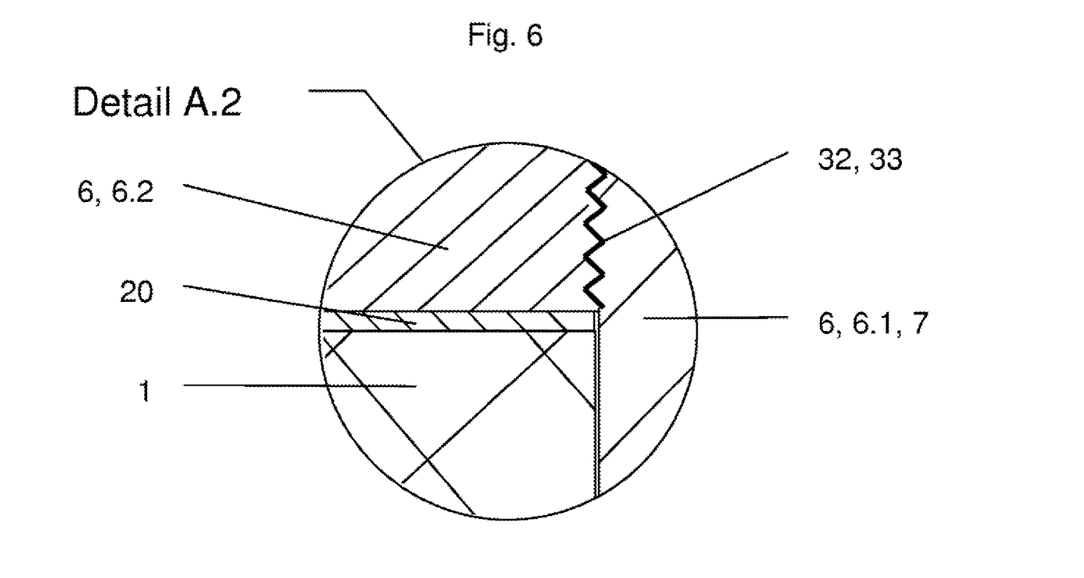

FIG. 2 shows a device according to the invention for introducing force into a board 1 made from fiber composite material to be used e.g. for connecting a transverse control arm in a vehicle chassis. A round-holed passage 2 is visible in board 1. The device has a two-part metal bush 6 with a first, lower bush part and a second upper bush part 6.2, being arranged on either side of board 1. Both bush parts 6.1 are shown rotationally symmetric and can easily be produced by turning. The lower bush part 6.1 has a longitudinally extended hollow cylindrical shaft 7, protruding through passage 2 into board 1. Shaft 7 is firmly attached to the bearing stress surface 4 of passage 2. The hollow cylindrical shaft 7 ends in a circular passage opening 8 at the upper bush part 6.2, whereby achieving at least a firmly fitting connection of bush parts 6.1, 6.2 as a plug connection. Further types of execution of the connection of both bush parts 6.1, 6.2 are shown in FIGS. 4, 5, and 6 and explained in the appertaining description.

A bolt-type connecting element 9 is guided through one end of the hollow cylindrical shaft 7 of the lower bush part 6.1 and is screw-connected with the bush parts 6.1 and 6.2 by means of a nut 10 and a washer 11. Shaft 7 shows an inner conically shaped mating surface 12 corresponding to a conically shaped girthed area of connecting element 9, such that by screw-connecting connecting element 9 with the bush parts 6.1 and 6.2, an additional frictional connection is established by means of an interference fit between shaft 7 and the connecting element 9. At the other end of the connecting element 9 a connecting element 13 of a construction not shown is arranged, such as e.g. that of a transverse control arm, whereby the connecting element 13 is connected to connecting element 9 by means of a further screw-connection with nut 14. A diagonal force FQ is generated from the not displayed construction, acting parallel to the board level and introduced selectively into the board 1 via the connecting element 9.

Both bush parts 6.1, 6.2 have each a union collar 15.1 and 15.2 extending in radial direction with a collar side 16.1 and 16.2, each facing one side of the board 1, that is the upper side 17 resp. the bottom side 18 of board 1. The collar sides 16.1, 16.2 are each provided with a polished sliding surface 16.1, 16.2.

The diagonal force FQ attacking the device is guided via shaft 7 of the lower bush part 6.1 mainly across the surface into the bearing stress surface 4 of passage 2 of board 1. A tilting-resp. bending moment resulting from the lever effect is extensively counteracted on the upper side 17 and the bottom side 18 of the board via the union collars 15.1, 15.2 of both bush parts 6.1 and 6.2, without stressing the edge sections 5 of the passage. At the contact point between the sliding surfaces 16.1, 16.2 of union collars 15.1, 15.2 and the upper side 17 resp. the bottom side 18 of board 1, the relative movements of bush parts 6.1, 6.2 are made possible in radial direction with little friction force acting on board 1.

This embodiment of the device according to the invention reduces as far as possible the effects that board 1 made of fiber composite material is damaged or subject to wear.

Figure 3:
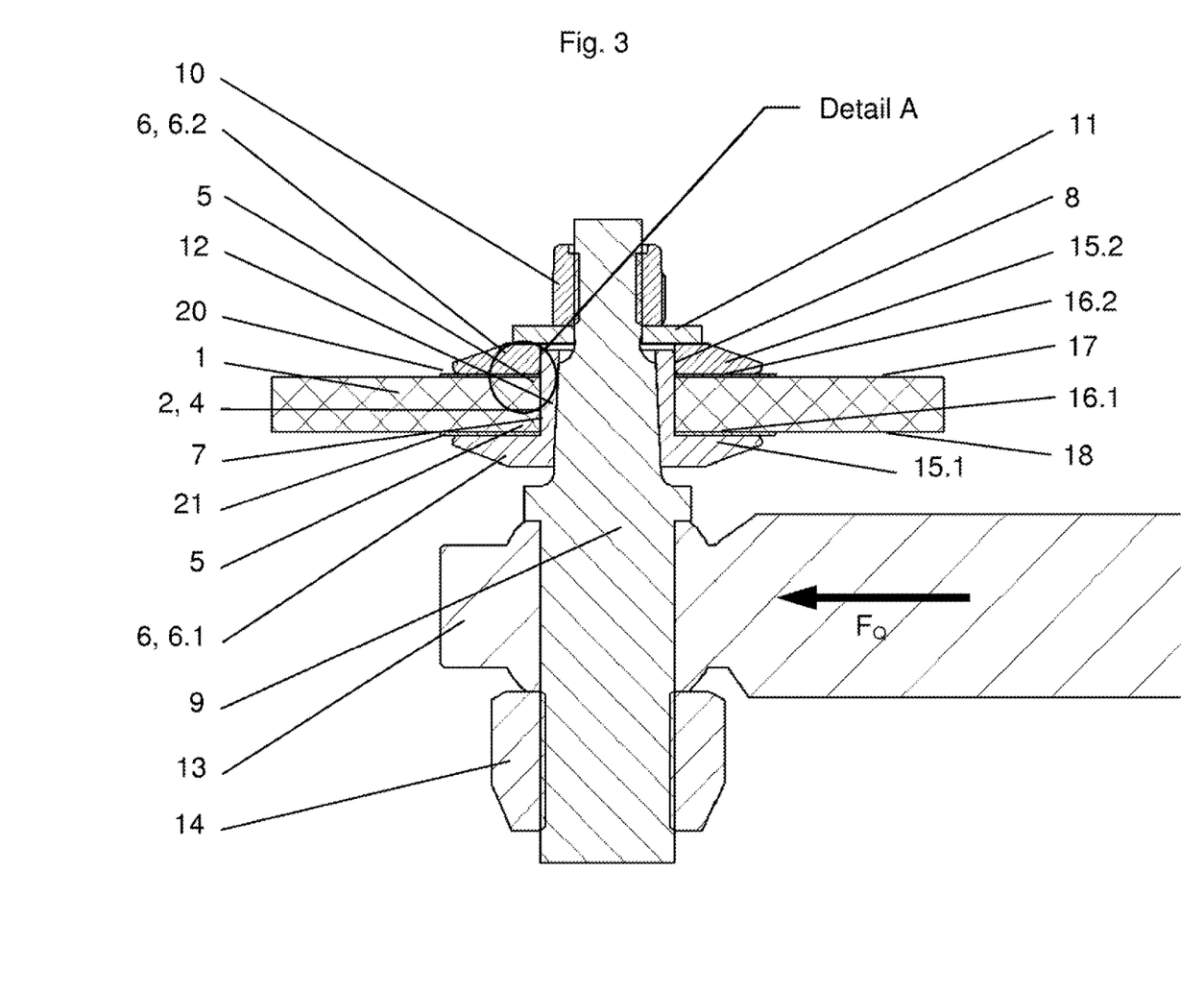

FIG. 3 shows a device according to the invention for introducing force into board 1 made from fiber composite material according to a second exemplary embodiment. In order to avoid repetition, only differentiating features and components as compared to FIG. 2 will be described in the following. Components with the same function have the same reference numbers.

In contrast to the device of FIG. 2, in this embodiment of the device according to the invention there is a thin sliding disk 20, 21 made from hardened metal each arranged between collar side 16.2 of the union collar 15.2 of the upper bush part 6.2 and the upper side 17 of board 1, as well as between the collar side 16.1 of union collar 15.1 of the lower bush part 6.1 and the bottom side 18 of board 1. The hole cross-section of sliding disks 20, 21, corresponds with the hole cross-section of passage 2 and cover thus the section of the edge 5 of the passage 2 completely. The sliding disks 20, 21, are bonded to the upper-resp. bottom side 17, 18 of board 1. The surfaces of sliding disks 20, 21 facing union collars 15.1, 15.2 are either ground or polished.

The tilting-resp. bending moment resulting from the lever effect is supported largely on the sliding disks 20, 21 via the union collars 15.1 and 15.2 of both bush parts 6.1 and 6.2. The sliding disks 20, 21 hereby create a wear-resistant protective layer for the sensitive surfaces at the upper- and bottom side 17, 18 of board 1. The relative movements of the bush parts 6.1, 6.2 exclusively occur at the contact points between the sliding surfaces 16.1, 16.2 of union collars 15.1, 15.2 and the sliding disks 20, 21 with little friction force. Thus the compressive force resulting from the tilting-resp. bending moment at the upper-resp. bottom side 17, 18 of board 1 are even better distributed, completely removing a friction wear at the edge sections 5 of passage 2 and at the upper-resp. bottom side 17, 18.

FIG. 4 shows a device according to the invention for introducing force into board 1 made of fiber composite material according to the third exemplary embodiment. In order to avoid repetition, only differentiating features and components as compared to FIG. 2 will be described in the following. Components with the same function have the same reference numbers.

In case of the alternative bush 6' according to this embodiment, the upper bush part 6.2' is equipped with a circular opening 22 and a circular passage opening 23. The shaft end 7' of the lower bush part 6.1' is inserted in the recessed opening 22 of the upper bush part 6.2', while the passage opening 23 of the upper bush part 6.2' encloses the connecting element 9 passing through. Thus an interlocking connection of bush parts 6.1', 6.2' with each other as well as an interlocking connection of connecting element 9 with the lower and upper bush part 6.1', 6.2' is created. This type of interlocking contributes to an even better transmission of the bending moment of the diagonal force.

The upper bush part 6.2' comprises the contact surface for nut 10 and supports the distribution of force onto the upper and bottom side 17, 18 of board 1 due to its conical shape. An angled sliding disk 24, 25 each with a circumferential web 26, 27 is arranged between the collar side 16.2' of the union collar 15.2' of the upper bush part 6.2' and the upper side 17 of board 1 as well as between collar side 16.1' of union collar 15.1' of the lower bush part 6.1' and the bottom side 18 of board 1. The sliding disks 24, 25 include the edge section 5 of passage 2 and completely cover the bearing stress surface 4 of passage 2. This means that there is a comprehensive interlocking of sliding disks 24, 25 with board 1. At the same time the sliding disks 24, 25 protect the upper and bottom side 17, 18 and the bearing stress surface 4 of passage 2 from friction wear. As was the case with sliding disks 20, 21 acc. to FIG. 3, also here a sliding level is created by sliding disks 24, 25 between collar sides 16.1', 16.2' of union collars 15.1', 15.2' and the sliding disks 24, 25.

At a transition between the union collar 15.1' and shaft 7', the lower bush part 6.1' is provided with a circumferential recess 28 in form of a hollowed-out groove. This provides the construction with a certain elasticity between shaft 7' and union collar 15.1' thus that possibly acting compressing forces can be transferred via the angled sliding disk 25 and are eliminated on the appertaining sliding surface.

The transition between the union collar 15.2' of the upper bush part 6.2' and the recessed opening 22 of the upper bush part 6.2' is beveled with an analogous function. A section of shaft 7' of the lower bush part 6.1' allocated to this area is tapered.

At a section of shaft 7' between the recess 28 and the tapered shaft, there is a ledge protruding beyond the circumference with an outer mating surface 29, corresponding with the webs 26, 27 of sliding disks 24 and 25. It is via this mating surface 29 that the share of normal force of the acting diagonal force FQ is guided to the sliding disks 24, 25 as a priority, and thereafter particularly evenly into the bearing stress area 4.

By using this embodiment of the device according to the invention, an angular introduction of force into board 1, caused by the tilting-resp. bending moment, can be omitted as far as possible. In particular, the edge sections 5 of passage 2 of board 1 can be protected better still.

FIG. 5 shows a schematic detailed view A.1 of the connection of bush parts 6.1, 6.2 of the device acc. to FIG. 3 by means of an interference fit. The outer girthed area at the end of shaft 7 of the lower bush part 6.1 and the girthed surface of passage opening of the upper bush part 6.2 are frictionally connected in an operative connection to each other via a mating surface each 30, 31.

FIG. 6 shows a detailed schematic view A.2 of the connection of bush parts 6.1, 6.2 of the device acc. to FIG. 3 by means of a screw connection. The outer girthed surface at the end of shaft 7 of the lower bush part 6.1 and the girthed areas of passage opening 8 show each an interlocking thread 32, 33.

These measures increase the operative connection of bush parts 6.1, 6.2 in order to introduce the tilting-resp. bending moment evenly into both bush parts 6.1, 6.2.

LIST OF REFERENCE NUMBERS

1 Component, board of fiber composite material
2 Hole, passage
3 Screw bolt
4 Bearing stress of hole, passage
5 Edge area of hole, passage
6 Two-part bush
6.1 First, lower bush part
6.2 Second, upper bush part
7 Shaft of bush part
8 Opening, passage opening of bush part
9 Connecting element
10 Nut
11 Washer
12 Inner mating surface of shaft
13 Connecting element
14 Nut
15 Union collar of bush part, .1, .2
16 Collar side, sliding surface of union collar .1, .2
17 Upper side of board
18 Bottom side of board
20 Sliding disk
21 Sliding disk
22 Opening, recessed opening of bush part 23 Opening, passage opening of bush part
24 Angled sliding disk
25 Angled sliding disk
26 Web
27 Web
28 Circumferential recess
29 Outer mating surface of shaft
30 Inner mating surface of shaft
31 Outer mating surface of shaft end
32 Inner thread of opening
33 Outer thread of shaft end

What is claimed is:

1. An arrangement for introducing force to a component of fiber composite material, wherein the arrangement comprises (i) the component of fiber composite material which comprises a passage, (ii) a bolt-shaped connecting element which is capable of providing a screw connection, and (iii) a bush which consists of a first bush part and a second bush part, borders the passage of the component and accommodates a part of the connecting element, the first bush part and the second bush part being configured to engage in one another in axial extension and each of the first and second bush parts comprising a radially extended union collar with a collar side which faces the component and on which a sliding surface is present.

2. The arrangement of claim 1, wherein the connecting element extends beyond the first bush part and the second bush part.

3. The arrangement of claim 1, wherein the first bush part comprises an axially extended shaft for being arranged in the passage of the component and for being inserted into an opening of the second bush part.

4. The arrangement of claim 3, wherein an outer contour of the axially extended shaft corresponds to an inner contour of the opening of the second bush part and/or to an inner contour of the passage.

5. The arrangement of claim 3, wherein the first bush part comprises a circumferential recess at a transition between its union collar and its shaft and/or the second bush part comprises a bevel at a transition between its union collar and its opening.

6. The arrangement of claim 1, wherein a sliding disk is arranged between the union collar of the first bush part and a first side of the component and/or between the union collar of the second bush part and a second side of the component.

7. The arrangement of claim 6, wherein the sliding disk is formed and arranged such that a surface of the sliding disk facing a union collar shows a lower roughness than a side of the sliding disk that faces the component.

8. The arrangement of claim 1, wherein the first bush part and the second bush part comprise mating surfaces or threads corresponding to each other.

9. The arrangement of claim 1, wherein the bush and the connecting element are configured such that the connecting element can be connected with the first bush part and/or with the second bush part in a form-fitting manner.

10. The arrangement of claim 1, wherein the connecting element can be frictionally and form-fittingly connected with the first bush part and/or with the second bush part.

11. An arrangement for introducing force to a component of fiber composite material, wherein the arrangement comprises (i) the component of fiber composite material which comprises a passage, (ii) a bolt-shaped connecting element which is capable of providing a screw connection, and (iii) a bush which comprises of a first bush part and a second bush part, borders the passage of the component and accommodates a part of the connecting element, the connecting element extending beyond the first bush part and the second bush part, the first bush part and the second bush part being configured to engage in one another in axial extension and each of the first and second bush parts comprising a radially extended union collar with a collar side which faces the component and on which a sliding surface is present.

12. The arrangement of claim 11, wherein the first bush part comprises an axially extended shaft for being arranged in the passage of the component and for being inserted into an opening of the second bush part.

13. The arrangement of claim 12, wherein an outer contour of the axially extended shaft corresponds to an inner contour of the opening of the second bush part and/or to an inner contour of the passage.

14. The arrangement of claim 12, wherein the first bush part comprises a circumferential recess at a transition between its union collar and its shaft and/or the second bush part comprises a bevel at a transition between its union collar and its opening.

15. The arrangement of claim 11, wherein a sliding disk is arranged between the union collar of the first bush part and a first side of the component and/or between the union collar of the second bush part and a second side of the component.

16. The arrangement of claim 15, wherein the sliding disk is formed and arranged such that a surface of the sliding disk facing a union collar shows a lower roughness than a side of the sliding disk that faces the component.

17. The arrangement of claim 15, wherein the sliding disk is bonded to the component.

18. The arrangement of claim 11, wherein the first bush part and the second bush part comprise mating surfaces or threads corresponding to each other.

19. The arrangement of claim 11, wherein the bush and the connecting element are configured such that the connecting element can be connected with the first bush part and/or with the second bush part in a form-fitting manner.

20. The arrangement of claim 11, wherein the connecting element can be frictionally and form-fittingly connected with the first bush part and/or with the second bush part.

* * * * *